(12) United States Patent
Mak et al.

(10) Patent No.: US 7,444,507 B2
(45) Date of Patent: Oct. 28, 2008

(54) METHOD AND APPARATUS FOR DISTRIBUTION OF DIGITAL CERTIFICATES

(75) Inventors: Wai Kwan Mak, Kowloon (HK); Victor C. Robison, Guelph (CA); Jesse R. Walker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 714 days.

(21) Appl. No.: 10/187,097

(22) Filed: Jun. 30, 2002

(65) Prior Publication Data

US 2004/0003238 A1   Jan. 1, 2004

(51) Int. Cl.
*H04L 9/00* (2006.01)
*G06F 7/04* (2006.01)
*G06F 15/16* (2006.01)

(52) U.S. Cl. ............... 713/156; 713/155; 713/175; 726/2; 726/4; 726/8; 726/12; 726/15; 380/258; 709/229; 705/67

(58) Field of Classification Search ......... 713/155–156, 713/175; 726/2, 4, 8, 11–12, 15; 380/258; 709/229; 705/67

See application file for complete search history.

(56) References Cited

U.S. PATENT DOCUMENTS

| | | | |
|---|---|---|---|
| 5,708,780 A * | 1/1998 | Levergood et al. ......... 709/229 |
| 5,732,137 A | 3/1998 | Aziz | |
| 5,982,898 A * | 11/1999 | Hsu et al. .................. 713/156 |
| 6,016,476 A * | 1/2000 | Maes et al. .................. 705/1 |
| 6,324,648 B1 * | 11/2001 | Grantges, Jr. ................ 726/12 |
| 6,526,506 B1 * | 2/2003 | Lewis ......................... 713/153 |
| 6,609,198 B1 * | 8/2003 | Wood et al. ................ 713/155 |
| 6,715,082 B1 * | 3/2004 | Chang et al. .................. 726/8 |
| 6,973,068 B2 * | 12/2005 | Inoue et al. ................ 370/338 |
| 6,978,364 B1 * | 12/2005 | Balaz et al. ................ 713/153 |
| 7,099,957 B2 * | 8/2006 | Cheline et al. ............. 709/245 |
| 7,181,530 B1 * | 2/2007 | Halasz et al. .............. 709/238 |
| 7,209,889 B1 * | 4/2007 | Whitfield .................... 705/14 |
| 2002/0023215 A1 * | 2/2002 | Wang et al. ................ 713/171 |
| 2002/0087478 A1 * | 7/2002 | Hudd et al. .................. 705/64 |
| 2002/0095507 A1 * | 7/2002 | Jerdonek .................... 709/229 |
| 2002/0194471 A1 * | 12/2002 | Benantar et al. ............ 713/158 |
| 2003/0076961 A1 * | 4/2003 | Kim et al. .................. 380/282 |
| 2003/0095663 A1 * | 5/2003 | Nelson et al. ............... 380/270 |
| 2003/0142641 A1 * | 7/2003 | Sumner et al. ............. 370/328 |
| 2003/0177389 A1 * | 9/2003 | Albert et al. ................ 713/201 |

\* cited by examiner

*Primary Examiner*—Minh Dieu Nguyen
(74) *Attorney, Agent, or Firm*—Blakely, Sokoloff, Taylor & Zafman LLP

(57) ABSTRACT

A method and apparatus for distribution of digital certificates. A limited access to networks by use of existing identity information allows distribution of digital certificates.

25 Claims, 3 Drawing Sheets

METHOD AND APPARATUS FOR DISTRIBUTION OF DIGITAL CERTIFICATES

TECHNICAL FIELD

The invention relates generally to secure networking and, more particularly, to a method and apparatus to allow limited access to a secure network to obtain a digital certificate.

BACKGROUND

Information transfer in a public infrastructure is subject to possible interception, interpretation by third parties, or other maladies not desired by the intended parties of the transfer. Many methods have therefore been developed to create secured relationships that ensure privacy of the communication, integrity of the message, access to information for only restricted parties and authenticity of the sender, as well as other features of private information and communication. Exemplary methods are Virtual Private Networks (VPNs), Secure Sockets Layer (SSL, see *Secure Socket Layer Protocol*, Version 3.0, November 1996), encryption, digital certificates and various other methods of protecting information access or transfer.

VPNs were developed to create a network within a shared infrastructure, or public network, that provides privacy without the necessity of a physically separate network. SSL provides a session-based encryption and authentication by a secure pipe between two parties, notably a client and a server, and SSL can prevent eavesdropping, tampering, and message forgery in client-server applications. Encryption, either with a secret key or with the public key infrastructure (PKI), provides a method of converting data into an encrypted form called ciphertext so that only parties with a key to unlock the information may be readily able to view it. Some of the numerous other secure relationships include Internet Protocol Security (IPsec), and secure e-mail, including Secure Multipurpose Mail Extensions (S/MIME) and Pretty Good Privacy (PGP), among others.

A problem related to each of these types of information protection methods, or tools, is that in order to establish them over a public network, there must be an initial exchange of agents such as keys, tools, or codes. Unintended parties may therefore acquire these agents and have access to subsequent information intended to be private or be able to create the information and pose as another entity. Therefore establishment of secured relationships is a critical part in their overall effectiveness.

Digital certificates are an integral part of establishment of secured relationships. Digital certificates are basically security attachments to electronic messages. Digital certificates are often used to verify that a user sending a message is who he or she claims to be, and to provide the receiver with the means to encode a reply. Digital certificates therefore provide a service that insures security in the actual distribution of secured relationship agents.

A problem with digital certificates is how to securely obtain them. To ensure proper security and the integrity of the digital certificate, their procurement is often time consuming or otherwise complex. Certificate Authorities (CA) manage distribution of digital certificates and often act as trusted third parties. A problem with CA's is that before a certificate can be created and distributed, third party trust must be established by some reasonably secure channel. Therefore, although a digital certificate provides authentication, the establishment of the digital certificate is subject to the same authentication problems that it is designed to solve.

BRIEF DESCRIPTION OF THE DRAWINGS

Embodiments of the invention are illustrated by way of example, and not necessarily by way of limitation in the figures of the accompanying drawings in which like reference numerals refer to similar elements.

DETAILED DESCRIPTION

A method and apparatus for distribution of a digital certificate and, more particularly, a method and apparatus to allow a limited access to a Virtual Private Network (VPN), or other secure network, to obtain a digital certificate by utilizing existing identity information are disclosed. In this regard, an innovative limited access to a VPN or other network is introduced to enable distribution of digital certificates.

In the following description numerous specific details are set forth in order to provide a thorough understanding of embodiments of the invention. It will be apparent, however, to one having ordinary skill in the art that the specific detail need not be employed to practice embodiments of the invention. In other instances, well known materials or methods have not been described in detail in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
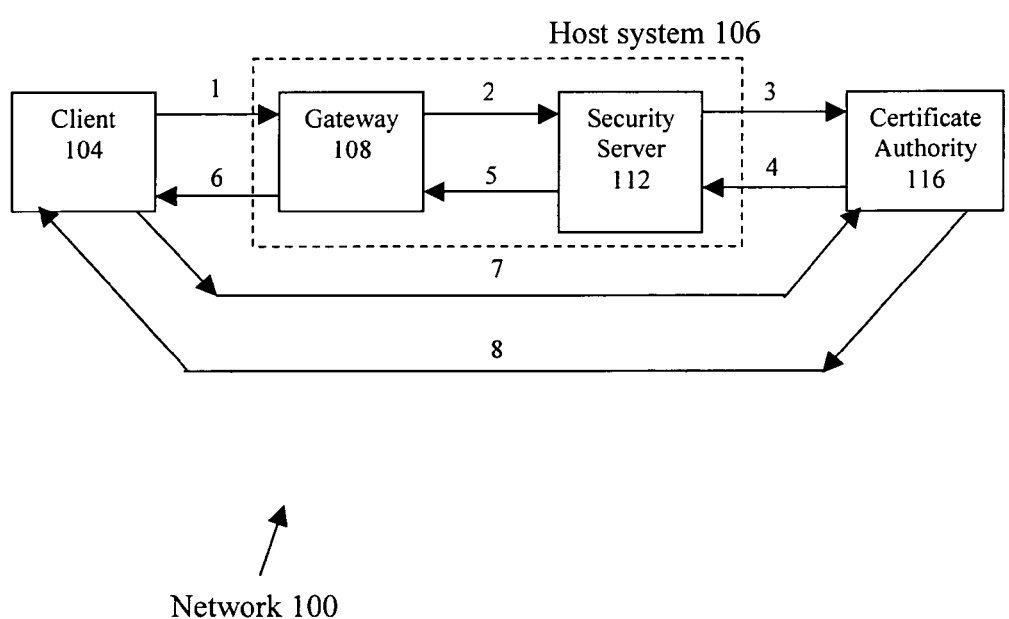
FIG. 1 is a functional block diagram of one embodiment of the invention.
Figure 2:
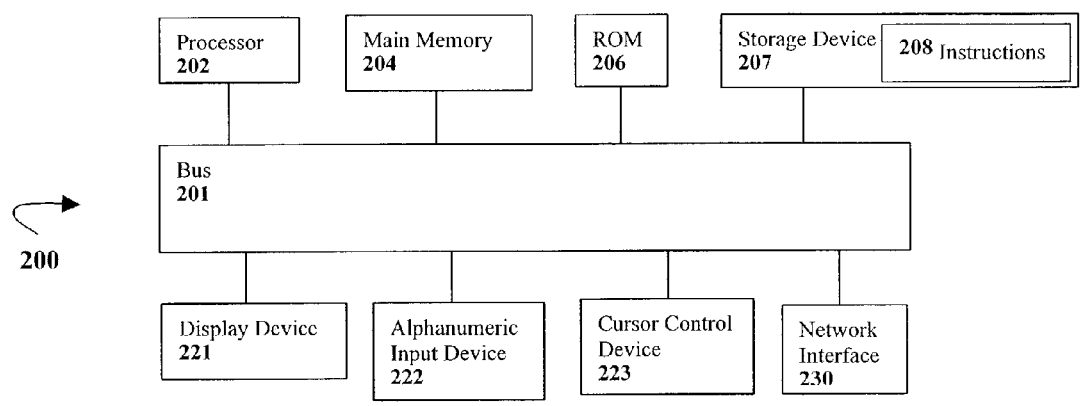
FIG. 2 is an illustration of a computing system capable of implementing an embodiment of the invention.

In FIG. 1, an embodiment of the present invention is disclosed in a functional block diagram showing portions of a virtual private network. As shown, the network 100 generally comprises a client 104 coupled with a host 106 also each being coupled with a certificate authority 116. The host system 106 includes a gateway 108 and a security server 112 coupled therewith. Together, the gateway 108 and security server 112 control access to the host system 106; as will be explained below. The certificate authority 116 controls issuance of digital certificates. The network 100 may comprise a VPN or other network providing a secure connection between the client 104 and host system 106.

It will be understood by one of ordinary skill in the art that the network 100 as shown is for descriptive purposes only, and that other variations for accomplishing the described aspects of the network may be employed without departing from the principles of or exceeding the scope of the present invention. Furthermore, different combinations of the elements disclosed in the network 100 may reside on the same network device, for example it will be understood by one in skill of the art that the gateway 108 and security server 112 may comprise a single network device.

Describing the methods by reference to a functional block diagram enables one skilled in the art to develop programs including instructions to carry out the methods on suitably configured computers (i.e., the processor or processors of the computer executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems or without an operating system.

In FIG. 1, an embodiment is illustrated by referencing numbered arrows between the different components of the network 100. In arrow 1, the client 104 establishes a connection to the gateway 108, and signals to apply for a digital certificate by sending its existing identity information to the gateway 108. In arrow 2, the gateway 108 passes the existing identity information to the security server 112 for verification. In arrow 3, the security server 112 verifies the existing identity information is correct and requests a use once password from the CA 116 on behalf of the client 104.

In arrow 4 of the embodiment shown in FIG. 1, the CA 116 returns a use once password to the security server 112, which in arrow 5 informs the gateway 108 that the existing identity information is verified and gives the use once password to the gateway 108. In arrow 6 the gateway 108 gives the use once password to the client 104 and allows it a limited access to the CA 116. The client 104, in arrow 7, uses the use once password to access CA 116 and apply for a digital certificate. In arrow 8, the CA 116 may generate a digital certificate for the client 104.

One embodiment provides use of existing identity information, such as a user login name and password, to verify the entity applying for the digital certificate, and therefore to allow a limited access. This embodiment can be utilized in a corporate network, for example a corporate VPN, in an efficient manner because the corporate network generally already stores identity information about the user. It will be understood by one of skill in the art that numerous other types of identity information, such as a uniform resource locator (URL), a server IP address, a public encryption key, a user's distinguished name, or any other identity means that the network has regarding the applying entity independent of the digital certificate application.

Another embodiment of the present invention is to send the public encryption key along with the existing identity information so that upon verification of access credentials, the first response from the CA 116 includes the digital certificate which can then even be sent directly to the client applying for the digital certificate.

For example, users of corporate intranets often have a workstation on corporate property premises and generally the user has an email program or a network access utilizing the workstation. The workstation may be a computing device such as a desktop computer, a laptop computer, a wireless computing device, or any other computing device capable of networking. It is often the case that new employees receive an email address or networking capabilities for their workstation before they are allowed access into the network from a remote location, for example, by use of a virtual private network.

Due to the establishment of networking capabilities before VPN utility is granted, the corporate network, or entity granting networking or email utility, often times has user name and password information, or other identity information such as social security numbers, relating to the user. It will be understood by one of skill in the art to utilize this existing identity information for the purpose of granting a limited access to any portion of the network to allow procurement of a more permanent access method such as a VPN.

In another embodiment, a client may be assigned a limited use password that is to be used by the client to gain limited access to the VPN for the purpose of requesting a digital certificate.

Computer system 200 includes bus 201 or other communication device to communicate or transmit information, and processor 202 coupled to bus 201 to process information. Processor 202 may include semiconducting processors generally, application specific integrated circuits (ASICs), programmable logic devices (PLDs), field programmable gate arrays (FPGAs), digital signal processors (DSPs), embedded processors, chipsets, or any other processing device. While computer system 200 is illustrated with a single processor, computer system 200 can include multiple processors and/or co-processors. Computer system 200 further includes random access memory (RAM) or other dynamic storage device 204 (referred to as main memory), coupled to bus 201 to store information and instructions to be executed by processor 202. Main memory 204 also can be used to store temporary variables or other intermediate information during execution of instructions by processor 202.

Computer system 200 also includes read only memory (ROM) and/or other static storage device 206 coupled to bus 201 to store static information and instructions for processor 202. Data storage device 207 is coupled to bus 201 to store information and instructions. Data storage device 207 may comprise a magnetic disk or optical disc and corresponding drive, or other suitable non-volatile memory.

Computer system 200 can also be coupled via bus 201 to display device 221, such as a cathode ray tube (CRT) or liquid crystal display (LCD), to display information to a computer user. Alphanumeric input device 222, including alphanumeric and other keys, is typically coupled to bus 201 to communicate information and command selections to computer system 200. Another type of user input device is cursor control 223, such as a mouse, a trackball, or cursor direction keys to communicate direction information and command selections to computer system 200 and to control cursor movement on display 221. Computer system 200 further includes network interface 230 to provide access to a network, such as a local area network.

Instructions are provided to memory from a storage device, such as magnetic disk, a read-only memory (ROM) integrated circuit, CD-ROM, DVD, via a remote connection (e.g., over a network via network interface 230) that is either wired or wireless, etc. In alternative embodiments, hard-wired circuitry can be used in place of or in combination with software instructions to implement embodiments of the invention. Thus, the present invention is not limited to any specific combination of hardware circuitry and software instructions.

The apparatus may be specially constructed for the required purposes, or may comprise a general-purpose computer selectively activated or reconfigured by a computer program stored in a computer. Such a computer program may be stored in a machine-readable storage medium, such as, but not limited to, any type of magnetic or other disk storage media including floppy disks, optical storage media, CD-ROMs, and magnetic-optical disks, read-only memories (ROMs), random access memories (RAMs), EPROMs, EEPROMs, Flash memory, magnetic or optical cards; or any type of media suitable for storing electronic instructions, and each coupled to a computer system bus.

In one embodiment the storage medium 207 includes executable content or instructions 208, and the processor 202 may selectively access and execute the content 208 to implement the above described embodiments for distribution of digital certificates. For example, each of the client 104, the gateway 108 or the security server 112 may comprise and or be implemented on computer system 200. Furthermore, the gateway 108 and security server 112 may be combined as portions of the same device. It will be understood by one of ordinary skill in the art how to configure a computing system to aid in distribution of digital certificates as disclosed in examples herein.

Figure 3:
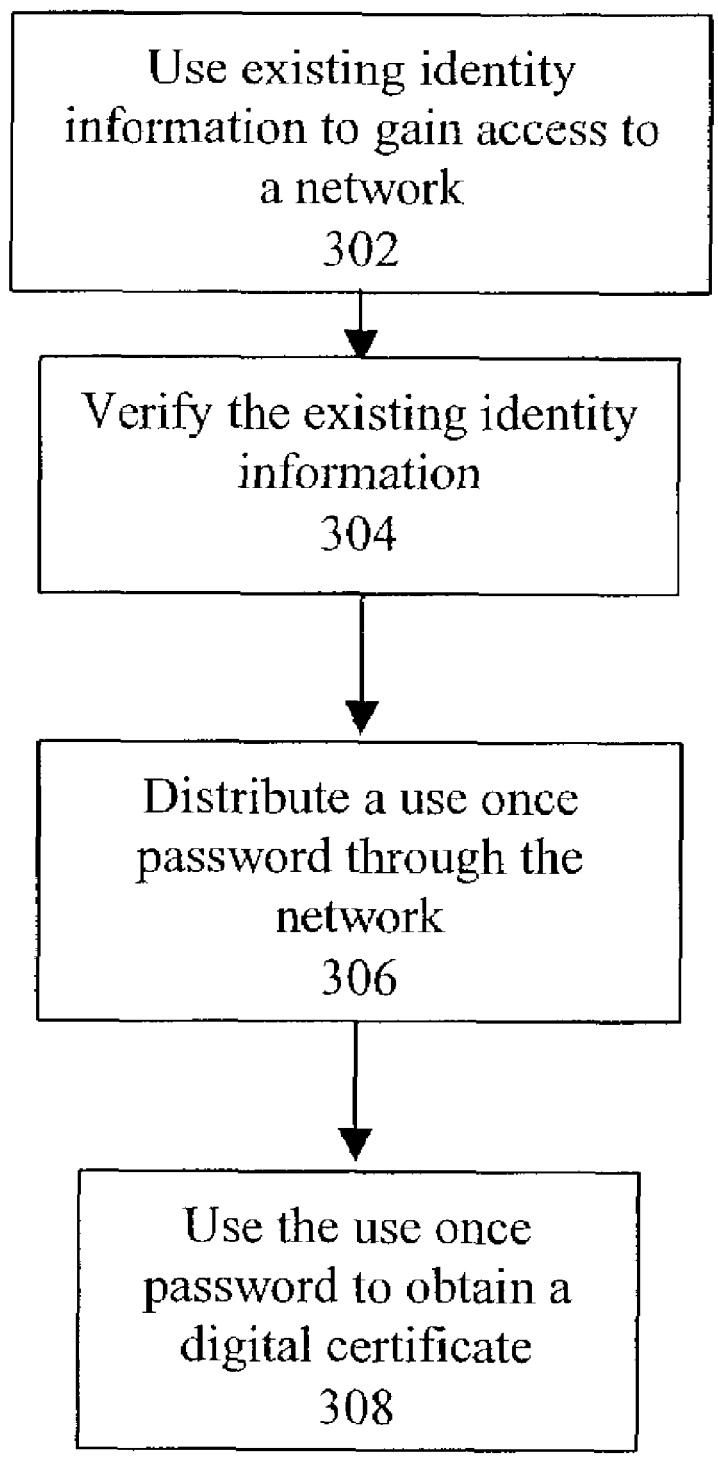
FIG. 3 is a flowchart illustration of one embodiment of the invention.

FIG. 3 is a flowchart illustrating one embodiment of a method for a limited access to a network to obtain a digital certificate. It will be understood by one of ordinary skill in the art how to create other flowcharts illustrating how to implement other embodiments of the present invention. Turning now to FIG. 3, the particular methods of the invention are described in terms of computer software with reference to a flowchart. The methods to be performed by a computer constitute computer programs made up of computer-executable instructions.

Describing the methods by reference to a flow diagram enables one skilled in the art to develop such programs including such instructions to carry out the methods on suitably configured computers (i.e., the processor or processors of the computer executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems or without an operating system.

In FIG. 3, a client requesting a digital certificate uses existing identity information to gain access to a host network in block 302. The host network verifies the existing identity information in block 304. In block 306 a use once password is distributed to the requesting client. In block 308 the requesting client uses the password to obtain a digital certificate from the CA 116.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

We claim:

1. A method comprising:
   receiving a request from a device to gain access to a network to apply for a digital certificate, the request containing existing identity information;
   verifying the existing identity information; and
   requesting a use once password from a certificate authority on behalf of the device, the use once password being used to access the certificate authority to obtain the digital certificate;
   wherein if the use once password is granted, the use once password is forwarded to the requesting device.

2. The method of claim 1 wherein the network comprises a virtual private network.

3. The method of claim 2 wherein the existing identity information comprises at least one of a username, a user password, a uniform resource locator, a public encryption key, a user's distinguished name, and a network address.

4. A method comprising:
   connecting to a gateway using authentication information; and
   signaling to apply for a digital certificate by sending existing identity information to the gateway, the existing identity information being passed to a security server for verification, wherein the security server verifies that the existing identity information is correct and requests a use once password from a certificate authority;
   receiving the use once password from the certificate authority;
   accessing the certificate authority using the use once password; and
   obtaining the digital certificate from the certificate authority.

5. The method of claim 4 wherein the existing identity information is at least one of a username, a user password, a uniform resource locator, a public encryption key, a user's distinguished name, and a network address.

6. A machine-readable storage medium having stored thereon data representing sequences of instructions which, when executed by a processor, cause the processor to perform operations comprising:
   receiving a request from a device to gain access to a network to apply for a digital certificate, the request containing existing identity information;
   verifying the existing identity information; and
   requesting a use once password from a certificate authority on behalf of the device, the use once password being used to access the certificate authority to obtain the digital certificate;
   wherein if the use once password is granted, the use once password is forwarded to the requesting device.

7. The medium of claim 6 wherein the network is a virtual private network.

8. The medium of claim 6 wherein the existing identity information is at least one of a username, a user password, a uniform resource locator, a public encryption key, a user's distinguished name, and a network address.

9. A method comprising:
   receiving a request from a device to gain limited access to a network for purpose of requesting a digital certificate, the request containing existing identity information;
   verifying the existing identity information; and
   requesting a limited use password from a certificate authority on behalf of the device, the limited use password being used to access the certificate authority to obtain the digital certificate;
   wherein if the limited use password is granted, the limited use password is forwarded to the requesting device.

10. The method of claim 9 wherein the network comprises a virtual private network.

11. The method of claim 9 wherein the existing identity information is at least one of a username, a user password, a uniform resource locator, a public encryption key, a user's distinguished name, and a network address.

12. A machine-readable storage medium having stored thereon data representing sequences of instructions which, when executed by a processor, cause the processor to perform operations comprising:
   connecting to a gateway using authentication information; and
   signaling to apply for a digital certificate by sending existing identity information to the gateway, the existing identity information being passed to a security server for verification, wherein the security server verifies that the existing identity information is correct and requests a use once password from a certificate authority;
   receiving the use once password from the certificate authority;
   accessing the certificate authority using the use once password; and
   obtaining the digital certificate from the certificate authority.

13. The machine-readable storage medium of claim 12 wherein the existing identity information is at least one of a username, a user password and a network address.

14. A machine-readable storage medium having stored thereon data representing sequences of instructions which, when executed by a processor, cause the processor to perform operations comprising:
receiving a request from a device to gain limited access to a network for purpose of requesting a digital certificate, the request containing existing identity information;
verifying the existing identity information; and
requesting a limited use password from a certificate authority on behalf on the device, the limited use password being used to access the certificate authority to obtain the digital certificate;
wherein if the limited use password is granted, the limited use password is forwarded to the requesting device.

15. The machine-readable storage medium of claim 14 wherein the network comprises a virtual private network.

16. The machine-readable storage medium of claim 14 wherein the existing identity information is at least one of a username, a user password, a uniform resource locator, a public encryption key, a user's distinguished name, and a network address.

17. A system comprising:
a gateway connected to a network; and
a security server coupled to the gateway;
wherein the gateway receives a request from a client to gain access to a network to apply for a digital certificate, the request containing existing identity information, the security server verifies the existing identity information and request a use once password from a certificate authority on behalf of the client, the use once password being used to access the certificate authority to obtain the digital certificate; and
wherein if the use once password is granted, the use once password is forwarded to the client.

18. The system of claim 17 wherein the network comprises a virtual private network.

19. The system of claim 17 wherein the existing identity information is at least one of a username, a user password, a uniform resource locator, a public encryption key, a user's distinguished name, and a network address.

20. A system comprising:
a gateway connected to a network;
a security server coupled to the gateway; and
a client connecting to the gateway using authentication information, and signaling to apply for a digital certificate by sending existing identity information to the gateway, the existing identity information being passed to the security server for verification;
wherein the security server verifies that the existing identity information is correct and requests a use once password from a certificate authority; and
wherein the client receives the use once password from the certificate authority, accesses the certificate authority using the once password, and obtains the digital certificate from the certificate authority.

21. The system of claim 20 wherein the network comprises a virtual private network.

22. The system of claim 20 wherein the existing identity information is at least one of a username, a user password, a uniform resource locator, a public encryption key, a user's distinguished name, and a network address.

23. A system comprising:
a gateway connected to a network, the gateway receiving a request from a client to gain limited access to the network for purpose of requesting a digital certificate, the request containing existing identity information; and
a security server coupled to the gateway to verify the existing identity information and request a limited use password from a certificate authority on behalf of the client, the limited use password being used to access the certificate authority to obtain the digital certificate;
wherein if the limited use password is granted, the limited use password is forwarded to the client.

24. The system of claim 23 wherein the network comprises a virtual private network.

25. The system of claim 23 wherein the existing identity information is at least one of a username, a user password, a uniform resource locator, a public encryption key, a user's distinguished name, and a network address.

* * * * *